(12) United States Patent
Chen et al.

(10) Patent No.: US 12,003,351 B2
(45) Date of Patent: Jun. 4, 2024

(54) METHOD AND SYSTEM FOR MULTICARRIER SIGNAL TRACKING BASED ON DEEP LEARNING AND HIGH PRECISION POSITIONING

(71) Applicant: Wuhan University, Wuhan (CN)

(72) Inventors: Liang Chen, Wuhan (CN); Zhaoliang Liu, Wuhan (CN); Ruizhi Chen, Wuhan (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 18/454,851

(22) Filed: Aug. 24, 2023

(65) Prior Publication Data

US 2024/0073065 A1 Feb. 29, 2024

(30) Foreign Application Priority Data

Aug. 25, 2022 (CN) .......................... 2022110230926

(51) Int. Cl.
*H04L 25/02* (2006.01)
*H04L 5/02* (2006.01)

(52) U.S. Cl.
CPC .......... *H04L 25/0254* (2013.01); *H04L 5/023* (2013.01)

(58) Field of Classification Search
CPC .......................... H04L 25/0254; H04L 5/023
See application file for complete search history.

(56) References Cited

FOREIGN PATENT DOCUMENTS

| CN | 108923842 A | 11/2018 |
|---|---|---|
| CN | 209345164 U | 9/2019 |
| CN | 110716220 A | 1/2020 |

OTHER PUBLICATIONS

Bo Qu, Jiaolong Wei, Shuangna Zhang, Liang Bi, "Analysis of Multipath and CW Interference Effects on GNSS Receivers with EMLP Discriminator," Communications and Network, 2013, 5, 80-85, http://dx.doi.org/10.4236/cn.2013.53B2016 Published Online Sep. 2013 (http://www.scirp.org/journal/cn) (Year: 2013).*

* cited by examiner

*Primary Examiner* — Nader Bolourchi
(74) *Attorney, Agent, or Firm* — Nitin Kaushik

(57) ABSTRACT

The present invention discloses a method and system for multicarrier signal tracking based on deep learning and high precision positioning. Using the data characteristics of S-curve, and using S-curve which contains multipath signals as feature data for training deep learning networks under different signal-to-noise ratios. The delay regression results of receiving signal can be directly obtained by the S-curve of real-time receiving signal and the pre-trained network. The motivation of this method is to fully utilize the advantages of deep learning networks in accurately regressing complex problems with a large amount of data, fundamentally solving the impact of multipath signals on the delay estimation of the main path signal in traditional software defined receivers, extracting the corresponding relationship between the delay of main path and S-curve under the influence of different signal-to-noise ratios and different multipath signals.

4 Claims, 3 Drawing Sheets

METHOD AND SYSTEM FOR MULTICARRIER SIGNAL TRACKING BASED ON DEEP LEARNING AND HIGH PRECISION POSITIONING

CROSS-REFERENCE TO RELATED APPLICATIONS

The application claims priority to Chinese patent application No. 2022110230926, filed on Aug. 25, 2022, the entire contents of which are incorporated herein by reference.

TECHNICAL FIELD

The present invention relates multicarrier tracking and high precision positioning.

BACKGROUND

Current positioning methods mainly include traditional Global Navigation Satellite System (GNSS) positioning, wireless signal positioning (based on WIFI, Bluetooth, and Ultra-Wide Band, etc.), and multi-source sensor positioning. Although GNSS positioning is the mam. solution of Location-Based Services (LBS), the difficulty of using problems caused by severe signal attenuation and multipath phenomena in urban, canyon, and indoor areas has not been fundamentally solved. The indoor wireless signal positioning technology of opportunity signals can mainly be divided into two types: fingerprint positioning and geometric intersection positioning. Wherein fingerprint signal of opportunity positing method needs a significant amount of manpower, material resources, and cost to carry out extensive preliminary data collection work and regularly update fingerprint data. Although traditional geometric intersection indoor positioning method can obtain better navigation and positioning observation results from high signal-to-noise ratios signals in scenes with weak multipath effects. But in most areas where GNSS is rejected, these geometric intersection positioning methods also face signals with strong multipath effects and low signal-to-noise ratios. It is difficult for conventional methods to use such signals to achieve high precision of navigation, positioning, and observation. The positioning technology based on multi-source sensor requires accurate measurement results from various sensors and strict time synchronization, which often means higher costs. Meanwhile, the positioning technology based on multi-source sensor will continuously accumulate positioning errors during use, making it difficult to provide continuous high precision positioning services. In the transmission process of multicarrier wireless signals, the wireless signal is subject to various different interference factors in additive Gaussian white noise channels and multipath channels. The time-delay phase-locked loops and phase-locked loops and low-pass filtering were typically combined by the traditional wireless signal tracking method, Although this method can reduce the impact of environmental noise on signal racking results ma certain extent, itis difficult to obtain accurate navigation and positioning observations in areas with complex environmental and human activities such as cities and indoors.

SUMMARY

The multicarrier signal tracking method based on deep learning utilizes the data characteristics of S-curve, using S-curve which contains multipath signals as feature data for training deep learning networks under different signal-to-noise ratios. The delay regression results of receiving signal can be directly obtained by the S-curve of real-time receiving signal and the pre-trained network. The motivation of this method is to fully utilize the advantages of deep learning networks in accurately regressing complex problems with a large amount of data, fundamentally solving the impact of multipath signals on the delay estimation of the main path signal in traditional software defined receivers, extracting the corresponding relationship between the delay of main path and S-curve under the influence of different signal-to-noise ratios and different multipath signals. Meanwhile, due to the development of LTE and 5G technologies in recent years, the large-scale networking has been formed globally. The multicarrier signal tracking method based on deep learning can fully use existing large-scale coverage networks. This method not only can save the deployment cost of indoor positioning systems, but also eliminates the need to consider the power supply cost and post-maintenance of base stations, providing users with safe, stable, and high precision location services on mobile terminals in various complex environments.

BRIEF DESCRIPTION OF DRAWINGS

To make the technical solutions of the embodiments of the present invention clearer, a description of the drawings in the present invention will be given below.

DETAILED DESCRIPTION OF THE EMBODIMENTS

Figure 1:
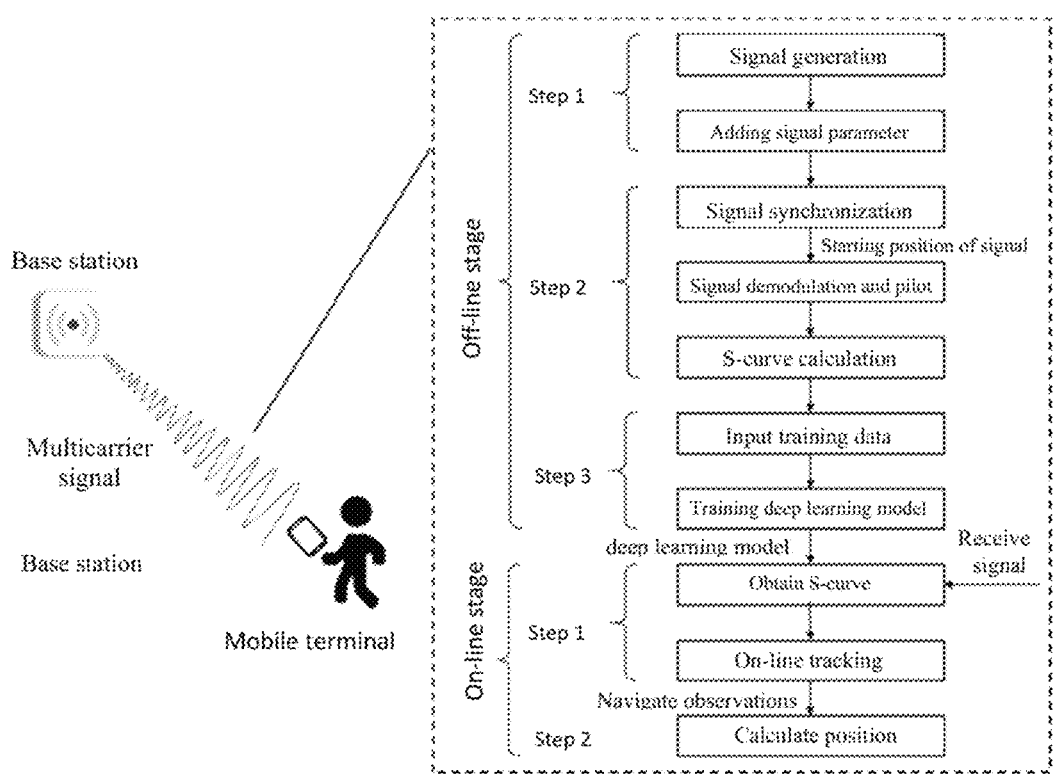
FIG. 1 is a flow chart which is a method for multicarrier signal tracking based on deep learning and high precision positioning provided by an embodiment of the present invention.
Figure 2:
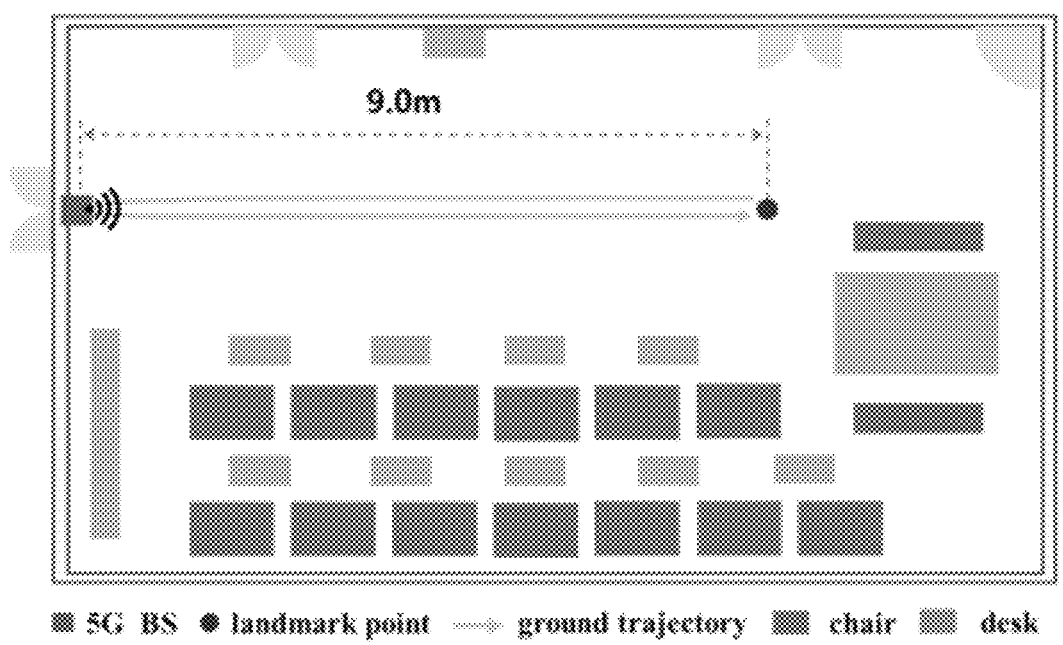
FIG. 2 is a schematic diagram of the 5G NR multicarrier tracking scenario provided by an embodiment of the present invention.

FIG. 1 shows a flowchart of a method for multicarrier signal tracking based on deep learning and high precision positioning, which is divided into two main stages: off-line stage and on-line stage.

Off-Line Stage

Step 1: Signal Definition (1) Signal Generation

Generating original multicarrier baseband signals based on the protocol for the targeted multicarrier signals.

(2) Adding Signal Parameter

Adding main path delay with a range of (−0.5, 0.5) and fixed delay resolution to the original multicarrier baseband signals. And based on the original multicarrier baseband signals, adding different signal-to-noise ratios, multipath delay, and multipath amplitude respectively. The range of main path delay should at least identify all fractional delays of one integer delay.

Step 2: Obtaining S-Curve Feature Data (1) Signal Synchronization

According to the protocol of collected multicarrier signal, using corresponding methods to coarse synchronization of the multicarrier signal, and obtain the starting position of the signal.

(2) Signal Demodulation and Pilot Frequency Extraction

According to the multicarrier signal and detected signal of starting position, demodulating the signal, and extracting the applied pilot frequency information.

(3) S-Curve Calculation

Based on the early and late output results of the received signal pilot sequence and the local reference pilot sequence, the S-curve corresponding to different signal parameters is obtained through the Early Minus Late Power (EMLP) discriminator function.

Step 3: Training the Deep Learning Network of S-Curve Feature Data

The S-curve shape of multicarrier wireless signal pilots is only related to the channel parameters of the received signal. Training S-curve feature data using different channel parameters with the deep learning model, the main path signal delay can be fitted to the S-curve, detailed methods are given below:

(1) Input Training Data

S-curve feature date of different signal parameters can be obtained by signal definition and S-curve. The S-curve feature data of each different main path delay label corresponds with different signal-to-noise ratios, multipath delay, and multipath amplitude parameters, using different main path signal delays as label. Input the delay label and S-curve feature data into the deep learning model.

(2) Training Deep Learning Model

The current mainstream deep learning models can be used for training S-curve feature data, but different deep learning models exhibit different training speeds and fitting accuracy during the training process. The model training will be completed to get training weight results when the loss function of deep learning model training is stable.

Off-line stage can be completed in computer.

On-line stage

Step 1: On-Line Tracking of Wireless Signal

In the process of the method, the S-curve at each moment can be calculated by the actual received multicarrier wireless signal, which is combined with the training weights of the off-line stage deep learning model to obtain the signal delay at each moment, detailed methods are given below:

(1) Obtain S-Curve

This step is same with step 2 of off-line, which obtains the S-curve at each moment of the actual measurement stage from the received wireless signal.

(2) On-Line Tracking

The S-curve feature data at each moment are respectively brought into the deep learning model to train in the off-line stage, and directly obtain the main path delay information of the received signal at the current moment, and further calculate the pseudo distance estimation of the mobile terminal signal.

Step 2: Position Calculation

In the network of multicarrier signals, based on the distance between multiple base stations and mobile terminals measured simultaneously, high precision positioning can be achieved through the geometric intersection method. Meantime, the results of distance measurement can also be used in combination with other positioning systems to improve the accuracy and stability of the positioning system.

In some examples, the present invention also provides an electronic device (mobile terminal), electronic device can be smartphone, vehicle-mounted terminal, vehicle-mounted terminal, and iPad, etc. The electronic device includes a processor, and memory. The processor stores instructions that can be executed by the processor. The processor is configured to implement all or part of the steps of the above method when executing the instructions in the memory.

In some examples, the present invention also provides a non-temporary computer-readable storage medium, which stores computer programs. The computer program executed by the processor implements part or whole steps described above. For example, the non-temporary computer-readable storage medium such as ROM, RAM, CD, magnetic disk, floppy disk, and optical data storage devices, etc.

The present invention takes indoor positioning by an indoor 5G base station as an example. Testing scenario as shown in FIG. 1, this method is used for distance tracking testing.

(1) Generating the Signal of 5G NR

Generating 5G signal which contains 5G NR signal synchronization block based on the protocol of 5G NR signal.

(2) Adding the Signal Parameter of 5G NR

Adding different main path delays to the generated 5G NR signal, respectively (the adding range of signal-to-noise ratios is −0.5 to 0.5 sample, with a resolution of 0.01 sample and the amplitude of the main path is fixed as 1). Adding different signal-to-noise ratios to 5G NR signal which has different main path delay, respectively (the adding range of signal-to-noise ratios is 0 to 50 dB, with a resolution of 5 dB), and a multipath signal with different amplitude (the amplitudes of multipath lower than the amplitudes of the main path 3 dB, 6 dB, 9 dB, and 12 dB, respectively) and delay (the adding range of multipath delay relative to the main path delay is −1 to 1 sample, with a resolution of 0.02 sample).

(3) Extracting the Pilot Frequency of 5G NR

Extracting corresponding pilot frequency of subcarrier data based on the protocol of 5G NR signal.

(4) Calculating the S-Curve of 5G NR

Based on the early and late output results of the received signal pilot frequency sequence and the local reference pilot frequency sequence, the S-curve corresponding to different signal parameters is obtained through the EMLP discriminator function. The definition of EMLP discriminator function is:

$$EMLP(\Delta\tau) = |Re(\Delta\tau)|^2 - |R_l(\Delta\tau)|^2 = G^2 A S(\Delta\tau, \xi)$$

where $\mathcal{R}_e(\Delta\tau)$ and $\mathcal{R}_l(\Delta\tau)$ are the forward and delay of received signal reference pilot frequency, respectively, G is the number of reference pilot frequency, A is the increase of received signal, $S(\Delta\tau, \xi)$ is S-curve signal.

(5) Training Deep Learning Model

Input main path delay as the label, the S-curve with different main path delay as training data into the deep learning model. The model training will be completed to get training weight results when the lass function of deep learning model training is stable. This embodiment has completed model training using three commonly used deep learning models, resulting in three types of deep learning models.

(6) the Calculation of Test Signal S-Curve

Complete the tracking and collection of actual commercial 5G NR signals, and extract the corresponding pilot frequency subcarrier data based on the protocol of the 5G NR signal. Calculate the S-curve of the testing data at each moment.

(7) On-Line Tracking

The S-curve feature data at each moment are respectively brought into the deep learning model to train in the off-line stage, directly obtain the main path delay information of the received signal at the current moment, and further calculate the pseudo distance estimation of the mobile terminal signal.

Figure 3:
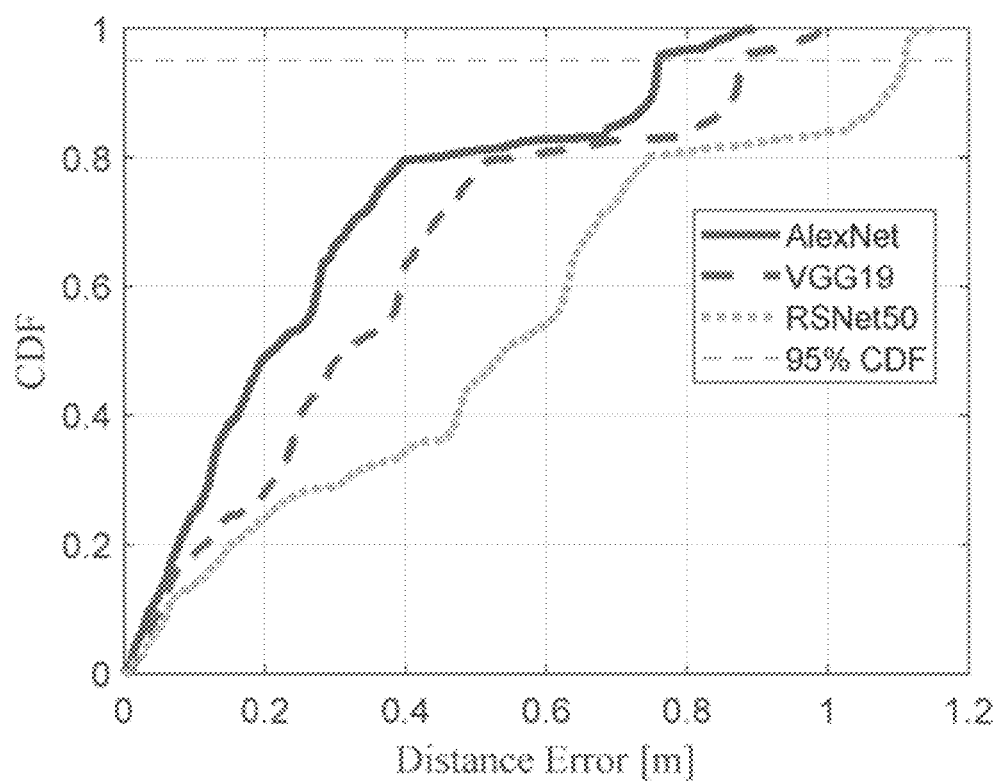
FIG. 3 is the error statistics results based on AlexNet, VGG 19, and RSNet tracking provided by an embodiment of the present invention.

As shown in FIG. 3, the error statistics results of indoor pedestrian tracking with the multicarrier signal tracking method based on deep learning. This embodiment uses three deep learning models to complete model training and actual measurement tracking. Where the 95% cumulative distribution function (CDF) based on AlexNet tracking error is 0.75 m, the 95% CDF based on VGG 19 tracking error is 0.87 m, and the 95% CDF based on RSNet tracking error is 1.10 m For the above method, it can be designed and validated by computer, and wireless signal acquisition can be achieved through software defined receiver such as Universisal Software Radio Peripheral (USRP).

What is claimed is:

1. A deep learning model training method of multicarrier signal using S-curve, comprising:
   generating original multicarrier baseband signals based on a protocol for targeted multicarrier signal;
   adding fixed delay resolution and main path delay with setting range to the original multicarrier baseband signals, and adding, based on the original multicarrier baseband signals, different signal-to-noise ratios, multipath delay, and multipath amplitude respectively;
   according to a protocol of collected multicarrier signal, coarse synchronizing the added multicarrier signals, and obtaining starting position of the added multicarrier signals;
according to the protocol of multicarrier signal and obtained starting positions, demodulating the added multicarrier signals, and extracting an applied pilot frequency information of a received pilot signal;
   based on the early and late correlation of the received pilot signal and a reference pilot signal, obtaining S-curve corresponding to different signal parameters, by an Early Minus Late Power (EMLP) discriminator function;
wherein the EMLP discriminator function is defined as:

$$EMLP(\Delta\tau)=|R_e(\Delta\tau)|^2-|R_l(\Delta\tau)|^2=G^2AS(\Delta\tau,\xi)$$

wherein $R_e(\Delta\tau)$ and $R_l(\Delta\tau)$ are the early and late correlation outputs of the received pilot signal and the reference pilot signal, respectively, G is the number of pilot, and A is the gain of the received signal, and $S(\Delta\tau,\xi)$ is S-curve of the received signal;
wherein S-curve feature data of each different main path delay label corresponding with different signal-to-noise ratios, multipath delay, and multipath amplitude parameters, using different main path delay as label;
inputting a delay label and the S-curve feature data into deep learning model;
wherein the deep learning model training will be completed to get training weight results when the loss function of the deep learning model training is stable.

2. The method according to claim 1, wherein the range of main path delay at least identify a whole fractional delay of an integer delay.

3. A tracking and positioning method of multicarrier signal, comprising:
   calculating S-curve at each moment of a received multicarrier wireless signal;
   inputting S-curve feature data of each moment to a trained deep learning model, which is trained by the method of claim 1;
   getting main path delay information of each moment of received signal, and further calculating a pseudo distance estimation of a mobile terminal signal;
   achieving, in a network of multicarrier signal, based on a distance between multiple base stations and mobile terminals measured simultaneously, high precision positioning through geometric intersection method.

4. An electronic device, further comprising:
processor;
memory, which is used to store instructions that can be executed by the processor; where the processor is configured to execute the instruction to implement the method of claim 3.

* * * * *